United States Patent
Fritzges et al.

(10) Patent No.: US 8,332,625 B2
(45) Date of Patent: *Dec. 11, 2012

(54) METHOD AND APPARATUS TO PROVIDE FAILOVER CAPABILITY OF CACHED SECURE SESSIONS

(75) Inventors: Eric A. Fritzges, Marietta, GA (US); Larry D. Bisel, Canton, GA (US); Edward C. Kersey, Alpharetta, GA (US); Patrick D. Tate, Dunwoody, GA (US); Bruce F. Wong, Athens, GA (US); Bradley D. Dike, Glen Allen, VA (US); Andre Justin Pecqueur, Roswell, GA (US); Shaheed Bacchus, Athens, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,183

(22) Filed: Aug. 22, 2011

(65) Prior Publication Data
US 2011/0307692 A1 Dec. 15, 2011

Related U.S. Application Data

(63) Continuation of application No. 11/032,353, filed on Jan. 10, 2005, now Pat. No. 8,006,091.

(51) Int. Cl.
*H04L 29/06* (2006.01)
(52) U.S. Cl. .......................... 713/151; 713/171
(58) Field of Classification Search .................. 713/171, 713/151
See application file for complete search history.

(56) References Cited

U.S. PATENT DOCUMENTS

| 5,657,390 A * | 8/1997 | Elgamal et al. | 713/151 |
| 2003/0235168 A1* | 12/2003 | Sharma et al. | 370/338 |
| 2004/0090937 A1* | 5/2004 | Chaskar et al. | 370/331 |

* cited by examiner

*Primary Examiner* — Gilberto Barron, Jr.
*Assistant Examiner* — Devin Almeida
(74) *Attorney, Agent, or Firm* — Hickman Palermo Truong Becker Bingham Wong LLP

(57) ABSTRACT

A method, apparatus and computer program product for providing failover capability of cached secure sessions is presented. A cached secure session involving a first device and a second device is identified. The cached secure session is encrypted and replicated to a failover device. The encrypted session is then decrypted on the failover to device. An occurrence of a hot failover involving the second device is detected, and processing resumes between the first device and the failover device.

17 Claims, 4 Drawing Sheets

METHOD AND APPARATUS TO PROVIDE FAILOVER CAPABILITY OF CACHED SECURE SESSIONS

BENEFIT CLAIM; CROSS-REFERENCE TO RELATED APPLICATIONS

The present application claims the benefit under 35 U.S.C. 120 as a continuation of U.S. application Ser. No. 11/032,353, filed on Jan. 10, 2005, now U.S. Pat. No. 8,006,091 the entire contents of which are hereby incorporated herein by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

BACKGROUND

Secure sessions are used for managing the security of a message transmission on a network such as the Internet. Secure Sockets Layer (SSL) and Transport Layer Security (TLS), which are based on SSL, are protocols typically used for managing the security of a message transmission. SSL uses a program layer located between the Internet's Hypertext Transfer Protocol (HTTP) and Transport Control Protocol (TCP) layers. The "sockets" part of the term refers to the sockets method of passing data back and forth between a client and a server program in a network or between program layers in the same computer. SSL uses the public-and-private key encryption system, which also includes the use of a digital certificate. While the following description references the use of SSL, it should be understood that TLS or other secure protocols could also be used.

Transferring sensitive information over a network can be risky due to several issues. A person cannot always be sure that the entity with whom the person is communicating is really the entity the person thinks they are dealing with. Network data can be intercepted, so it is possible that it can be read by an unauthorized third party, sometimes known as an attacker. If an attacker can intercept the data, the attacker may also be able to modify the data before sending it on to the receiver.

The use of SSL addresses these issues, as SSL allows each of two communicating parties to ensure the identity of the other party in a process called authentication. Once the parties are authenticated, SSL provides an encrypted connection between the two parties for secure message transmission. Encrypting the communication between the two parties provides privacy. The encryption algorithms used with SSL include a secure hash function to ensure that data is not modified in transit.

SSL is typically used in e-commerce transactions, and allows sensitive information, such as credit card numbers, to be transmitted securely over the Internet. One of the reasons SSL is effective is that it uses several different cryptographic processes. SSL uses public key cryptography to provide authentication, and secret key cryptography and digital signatures to provide for privacy and data integrity.

The primary purpose of cryptography is to make it difficult for an unauthorized third party to access and understand private communication between two parties. It is not always possible to restrict all unauthorized access to data, but private data can be made unintelligible to unauthorized parties through the process of encryption. Encryption uses complex algorithms to convert the original message, or cleartext, to an encoded message, called ciphertext. The algorithms used to encrypt and decrypt data that is transferred over a network typically come in two categories: secret key cryptography and public key cryptography.

Both secret key cryptography and public key cryptography depend on the use of an agreed-upon cryptographic key or pair of keys. A key is a string of bits that is used by the cryptographic algorithm or algorithms during the process of encrypting and decrypting the data. Safely transmitting a key between two communicating parties is not a trivial matter. A public key certificate allows a party to safely transmit its public key, while ensuring the receiver of the authenticity of the public key.

With secret key cryptography, both the client and the server use the same key to encrypt and decrypt the messages. Before any encrypted data can be sent over the network, both Client and Server must have the key and must agree on the cryptographic algorithm that they will use for encryption and decryption.

Secret key cryptography is also called symmetric cryptography because the same key is used to both encrypt and decrypt the data. Well-known secret key cryptographic algorithms include the Data Encryption Standard (DES), triple-strength DES (3DES), Rivest Cipher 2 (RC2), and Rivest Cipher 4 (RC4).

Public key cryptography utilizes both a public key and a private key. The public key can be sent openly through the network while the private key is kept private by one of the communicating parties. The public and the private keys are cryptographic inverses of each other; what one key encrypts, the other key will decrypt.

Public key cryptography is also called asymmetric cryptography because different keys are used to encrypt and decrypt the data. A well-known public key cryptographic algorithm often used with SSL is the Rivest Shamir Adleman (RSA) algorithm. Another public key algorithm used with SSL that is designed specifically for secret key exchange is the Diffie-Hellman (DH) algorithm. Public key cryptography requires extensive computations, making it compute intensive. It is therefore typically used only for encrypting small pieces of data, such as secret keys, rather than for the bulk of encrypted data communications.

When sending encrypted data, SSL typically uses a cryptographic hash function to ensure data integrity. The hash function prevents a nefarious user from tampering with the data that a client sends to a server. When data is processed by a cryptographic hash function, a small string of bits, known as a hash, is generated. The slightest change to the message typically makes a large change in the resulting hash. A cryptographic hash function does not require a cryptographic key. Two hash functions often used with SSL are Message Digest 5 (MD5) and Secure Hash Algorithm (SHA-1). A Message Authentication Code (MAC) is similar to a cryptographic hash, except that it is based on a secret key. When secret key information is included with the data that is processed by a cryptographic hash function, the resulting hash is known as a Hashed Message Authentication Code (HMAC).

Communication using SSL begins with an exchange of information between the client and the server. This exchange of information is referred to as the SSL handshake. The three main purposes of the SSL handshake are to negotiate the cipher suite, to authenticate identity, and to establish information security by agreeing on encryption mechanisms.

An SSL session begins with a negotiation between a client and a server as to which cipher suite they will use. A cipher suite is a set of cryptographic algorithms and key sizes that a computer can use to encrypt data. The cipher suite includes information about available public key exchange algorithms, secret key encryption algorithms, and cryptographic hash functions. The client tells the server which cipher suites it has available, and the server chooses the best mutually acceptable cipher suite.

In SSL, the authentication step is optional, but in the example of an e-commerce transaction over the Web, the client will generally want to authenticate the server. Authenticating the server allows the client to be sure that the server represents the entity that the client believes the server represents.

To prove that a server belongs to the organization that it claims to represent, the server presents its public key certificate to the client. If this certificate is valid, the client can be sure of the identity of the server.

The client and server exchange information that allows them to agree on the same secret key. For example, with RSA, the client uses the server's public key, obtained from the public key certificate, to encrypt the secret key information. The client sends the encrypted secret key information to the server. Only the server can decrypt this message since the server's private key is required for this decryption.

Both the client and the server now have access to the same secret key. With each message, they use the cryptographic hash function, chosen in the first step of this process, and share secret information, to compute a Hashed Message Authorization Code (HMAC) that gets append to the message. The client and server then use the secret key and the secret key algorithm negotiated in the first step of this process to encrypt the secure data and the HMAC. The client and server can now communicate securely using their encrypted and hashed data.

Failover is a backup operational mode in which the functions of a system component (such as a processor, server, network, or database, for example) are assumed by secondary system components when the primary component becomes unavailable through either failure or scheduled down time. Failover is used to make systems more fault-tolerant, and is typically an integral part of mission-critical systems that must be constantly available. The procedure involves automatically offloading tasks to a standby system component (also referred to as a failover device) so that the procedure is as seamless as possible to the end user. Failover can apply to any aspect of a system: within a personal computer, for example, failover might be a mechanism to protect against a failed processor; within a network, failover can apply to any network component or system of components, such as a connection path, storage device, or web server.

SUMMARY

Conventional mechanisms such as those explained above suffer from a variety of deficiencies. One such deficiency is that in a hot failover scenario involving a secure session between a client device and a server device, the SSL handshake has to be renegotiated using the failed over device. This is both time consuming and resource intensive, as it requires establishing new session keys with all the communicating peers.

Embodiments of the invention significantly overcome such deficiencies and provide mechanisms and techniques that provide failover capability of cached secure sessions. Embodiments of the present invention save the secure session cache in a secure manner in a hot-failover setup, while the hot device has failed. The current invention greatly reduces the amount of cryptographic computation that occurs during a failover event.

Embodiments of the present invention safely transfers cached secure (e.g., SSL/TLS) sessions to a failover device in a hot-failover setup such that the secure session can be resumed. In order to provide confidentiality of the secure session information, the cached secure session information is encrypted before replication to the backup device. The encrypted session information can only be decrypted by a failover device that has the same Master Encryption Key as the client device. Therefore, if a failover event should occur, the failover device can assume responsibility for the active secure session with a greatly reduced computational burden on all of the communicating parties.

In a particular embodiment of a method of providing failover capability of cached secure sessions between a client device and a server device, a cached secure session involving a first device and a second device is identified. The cached secure session associated with the first device and the second device is encrypted. The secure session is then replicated to a failover device. The encrypted session is then decrypted on the failover device. An occurrence of a hot failover involving the second device is detected, and processing of the secure session resumes between the first device and the failover device.

Other embodiments include a computer readable medium having computer readable code thereon for providing failover capability of cached secure sessions between a client device and a server device. The medium includes instructions for identifying a cached secure session involving a first and second device. The medium also includes instructions for encrypting the cached secure session and for replicating the cached secure session to a failover device. The medium additionally includes instructions for decrypting the encrypted session on the failover device. The medium further includes instructions for detecting an occurrence of a hot failover involving the second device, and instructions for resuming the cached secure session between the first device and the failover device.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides failover capability of cached secure sessions as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing failover capability of cached secure sessions as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
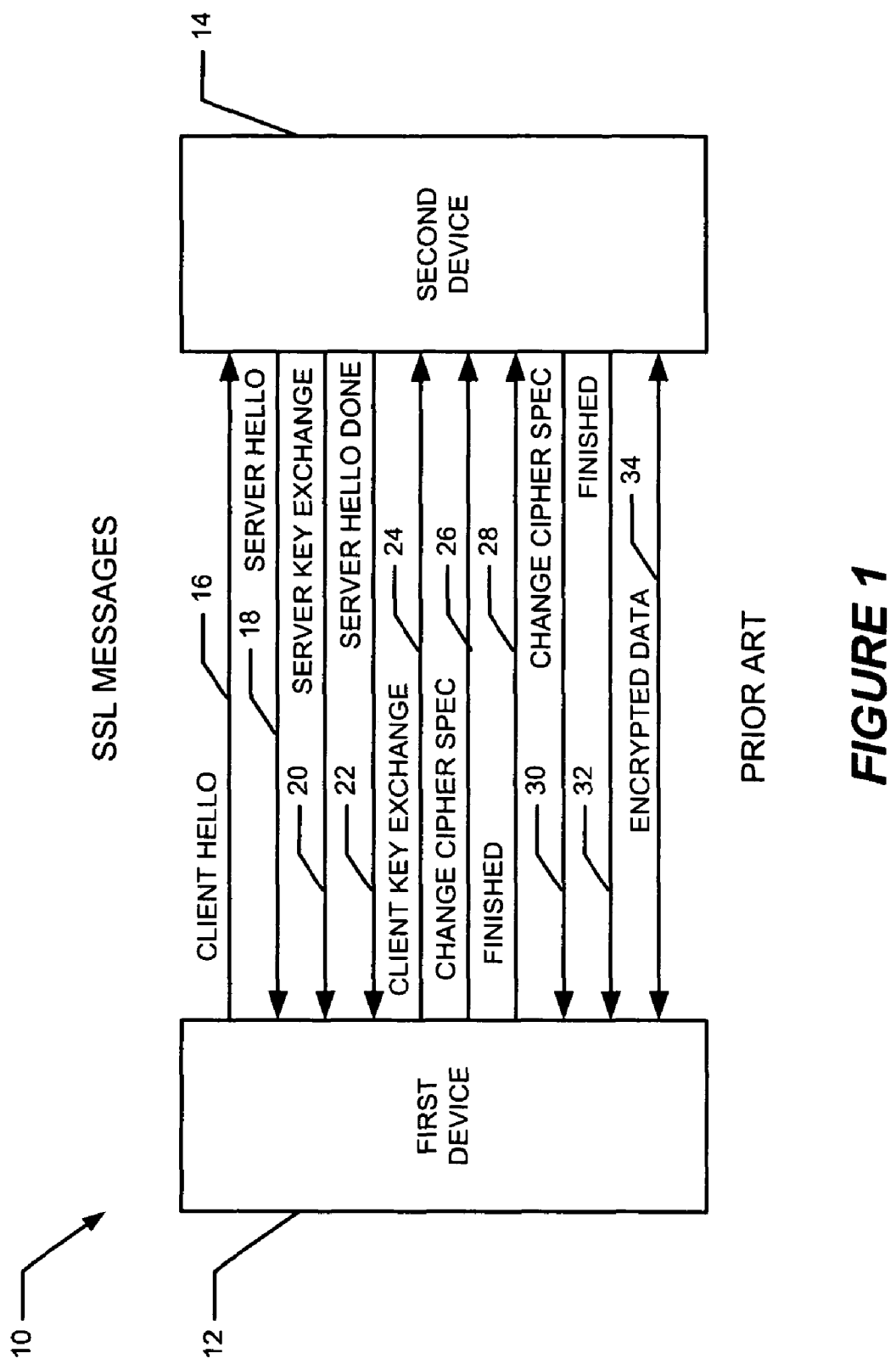
FIG. 1 comprises a block diagram of a prior art environment for exchanging secure messages.

A method and apparatus for providing failover capability of cached secure sessions includes detection of a failover event and provides for the cached secure session to be replicated on the failover device without having to renegotiate the entire secure session. The secure session is stored in a cache, and the transfer of the cache is encrypted, which allows the data to be shared among the active and failover devices without security concerns. This allows the cached secure sessions to be retained, saving important information. By saving the cache, it also reduces load on the failover device when it becomes active with connections. Thus, in the event of a failover occurrence, the secure session can be resumed using the failover device in place of the failed device, with a minimal amount of time and processing required.

The secure session cache information is stored in certain data structures, and secure session cache replication involves sending and receiving these data structures between the active device and the failover device. The sending and receiving of the secure session cache information is done using encryption (e.g. using Advanced Encryption Standard (AES)) which allows the data structures to be shared among the active and failover devices without security concerns. The encryption is done using a master secret, which is encrypted using a Master Encryption Key. The active device and the failover device have previously had identical Master Encryption Keys installed on them. A High Availability (HA layer) may be used for determining the destination of the secure session cache data structures, as well as the physical transport mechanism for transporting the secure session cache data.

In order to replicate the session cache information from an active device to a failover device, the active device forwards the session cache entry data structures to the High Availability (HA) layer, and the HA layer is responsible for getting the data to the failover device. Likewise, in the case of the local module providing backup for another module, the HA layer provides the remote module's session cache entry information to the local module.

When supporting secure session cache replication, the active device provides "backup" session cache tables for backing up both the client and server side session caches for the failover device (or multiple failover devices). The active device assumes that it is providing backup for a failover module of similar performance to itself, and allocates backup session caches large enough to backup itself.

In order to simplify the secure session cache lookup when the active device is functioning as the server, the session cache information that the server code generates includes an index into the session cache for the device that generated the session ID. In certain environments, redundant groups may be organized in "rings." Therefore, a single active device may be providing backup for two other devices, and each device contains two backup session caches to support this architecture.

In a particular embodiment, the timeout value of the replicated session cache entries on the active device is also valid on the failover device. In order to support this, the HA layer synchronizes the clocks between the active device and the failover device.

There are three different modes for replicating the cached secure session between an active device and a failover device. Two of the modes are referred to as "push" modes, wherein the active device pushes the session cache information to the failover device(s). These modes are configurable, so that either of these two modes may be specified in the active device's configuration. In addition, there is a "pull" mode for session cache replication, wherein a failover device can request that an active device provide an immediate update of session cache data that the failover device needs.

One of the push modes is referred to as continuous session cache replication. In order to ensure that the failover device receives session cache replication data during the normal running of the active device, the active device receives an indication from the HA layer that a failover device has come online. When the active device receives this indication, it replicates secure session cache information any time the secure session ID is used in a secure session handshake. Therefore, the session cache is replicated to the failover device when the secure session ID is initially established in the full handshake. The secure session cache is also replicated to the failover device any time the secure session ID is used in a resumed session handshake (if a failover device has been rebooted). In this mode, the session cache is being updated from the active device to the failover device continuously (as necessary) any time the session ID is used in a secure session handshake. Therefore, the failover device is made aware of any secure session ID that is resumed after the failover device comes online (even if the initial establishment of that session ID occurred significantly before the failover device came online). In this mode, it is possible that a failover device that has been online for a considerable period of time may receive secure session cache data updates when another failover device is rebooted. In this case, the failover device that already has the secure session cache information should not add a new entry to the secure session ID cache if the same session ID is already present in the session cache.

In a particular embodiment, the Continuous SSL/TLS Session Cache Replication is implemented using a standby_reboot_count in the ssl_server_session_cache_entry_t and the ssl_client_session_cache_entry_t. Any time a standby unit comes online, a global standby_boot_counter is incremented in the active SSL/TLS module. When an SSL/TLS session cache entry is placed in the session cache, the current value of the global standby_boot_counter is recorded in the ssl_server_session_cache_entry_t or the ssl_client_session_cache_entry_t. Each time the SSL/TLS module retrieves session information from a session cache, the local standby_reboot_count in the ssl_server_session_cache_ entry_t or the ssl_client_session_cache_entry_t is checked. If the local standby_reboot_count in the ssl_server_session_cache_entry_t or the ssl_client_session_cache_entry_t does not equal the current value of the global standby_boot_counter, a standby module has come online since that session cache information was replicated to the backup module(s), and the active SSL/TLS module must send the session cache data to the backup module(s). The active SSL/TLS module then updates the value of the local standby_reboot_count in the ssl_server_session_cache_entry_t or the ssl_client_session_cache_entry_t with the current value of the global standby_boot_counter.

This embodiment uses a single global standby_boot_counter, even if the backup of the active module is performed by two physical standby modules. Therefore, it is possible that a standby module that has been online for a considerable period of time may receive SSL/TLS session cache data updates when another standby module is rebooted. In this case, the backup SSL/TLS module that already has the SSL/TLS session cache information should not add a new entry to the SSL/TLS session ID cache if the same session ID is already present in the session cache.

With the Continuous Session Cache Replication method described above, it is possible that an infrequently used secure session ID that was negotiated before the failover device came online would not be replicated to the failover device. A push mode referred to as Instantaneous Session Cache Replication mode is designed to address this situation. Using the Instantaneous Session Cache Replication mode, the entire secure session ID cache is replicated to the failover device when the failover device comes online. The session cache update is very bursty, and could place significant load on the system resources, momentarily interrupting "normal" traffic processing for a brief period of time.

The pull mode of session replication is referred to as Manual Session Cache Replication. In this mode, a failover device can request an active device to send its session cache information. In this mode, the active device does not have to have the session cache replication configured. This is useful in the case where an active device is normally used without a failover device configured or in preparation for a scheduled maintenance procedure. In preparation for a scheduled maintenance period, a failover device is brought online, and the failover device requests the active device replicate its session cache. This session cache replication can be initiated from the failover device without having to modify the configuration on the active device.

Referring to FIG. 1, the signaling involved in an SSL/TLS handshake for a prior art environment 10 is shown. The messages are sent between a first device 12 and a second device 14. The first device may be a client with the second device a server, or alternately the first device could be a server with the second device being a client.

The first message is a Client Hello massage 16. The first device 12 sends the server information including the highest version of SSL it supports and a list of the cipher suites it supports. The cipher suite information includes cryptographic algorithms and key sizes.

Next, the second device sends a Server Hello message 18 to the client. The second device 14 chooses the highest version of SSL and the best cipher suite that both the first device 12 and second device 14 support and sends this information to the first device 12.

After the Server Hello message 18, a Server Key Exchange message 20 is sent from the second device 14 to the first device 12. The Server Key Exchange 20 message includes public key information.

Next, a Server Hello Done message 22 is sent. The second device 14 tells the first device 12 that it is finished with its initial negotiation messages.

A Client Key Exchange message 24 is generated next. For this message, the first device 12 generates information used to create a key to use for symmetric encryption. For RSA, the first device 12 then encrypts this key information with the second device's public key and sends it to the second device 14.

Following the Client Key Exchange message 24, a Change Cipher Spec message 26 is sent. The first device 12 sends a message telling the second device 14 to change to encrypted mode.

Next, a Finished message 28 is sent. This message is sent by the first device 12 to notify the second device 14 that it is ready for secure data communication to begin.

After receiving the Finished message 28, a Change Cipher Spec message 30 is sent. The second device 14 sends this message to direct the first device 12 to change to encrypted mode.

A Finished message 32 is then sent. The second device 14 tells the first device 12 that it is ready for secure data communication to begin. This is the end of the SSL handshake.

Following the SSL handshake described above, the first device and the second device communicate using the symmetric encryption algorithm and the cryptographic hash function negotiated earlier, and using the secret key that the first device sent to the second device. This is shown as Encrypted Data 34.

Certain signals of the SSL handshake are compute intensive to generate as they involve establishing session keys. For example, the server key exchange 20 and the client key exchange 24. Thus, in conventional systems, when an active device fails and the session needs to be replicated on a failover device, the messages shown in FIG. 1 must be performed again, including the compute intensive generation of session keys.

Figure 2:
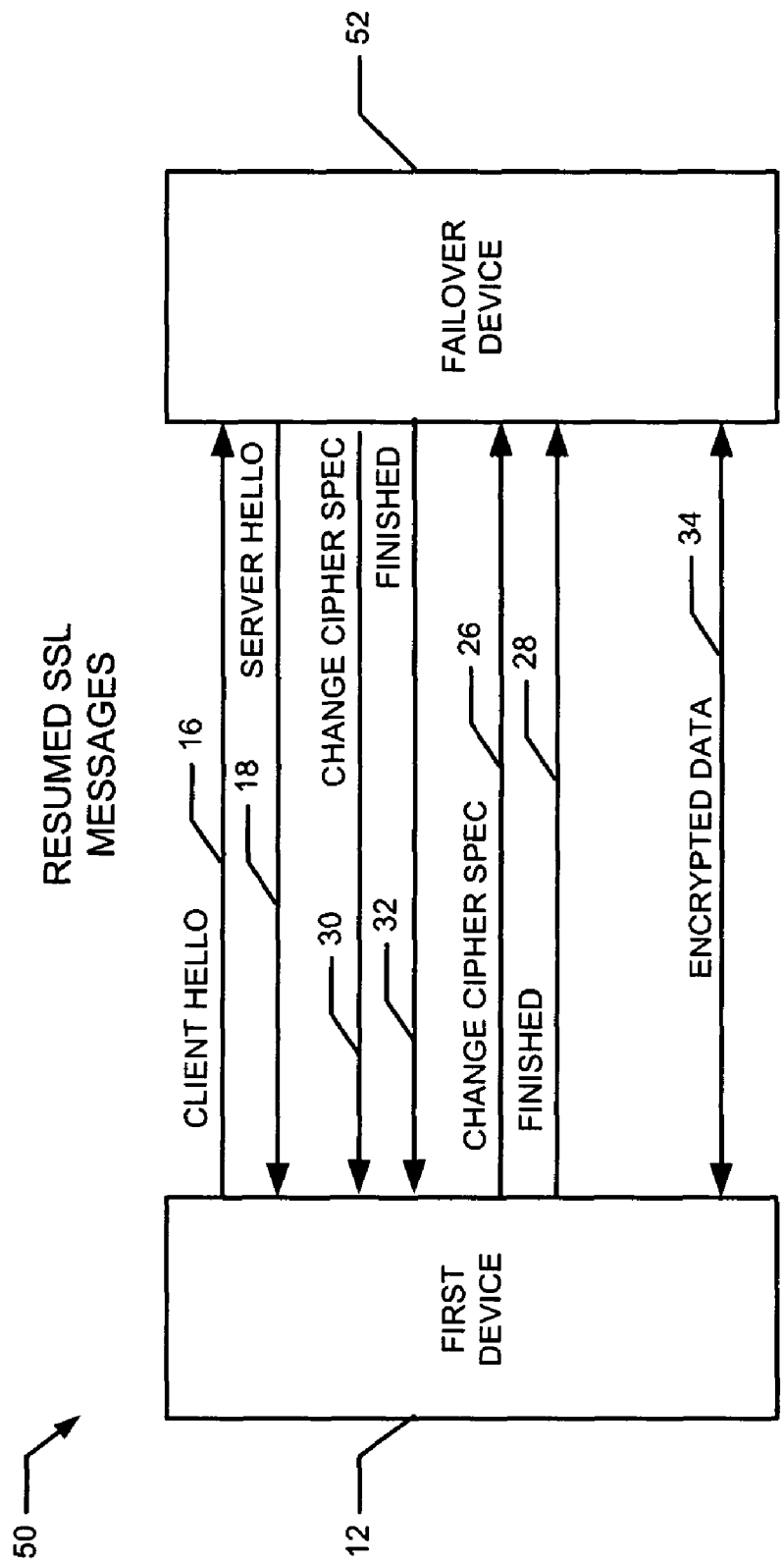
FIG. 2 comprises a block diagram of an environment for providing failover capability of cached secure sessions in accordance with embodiments of the invention.

Referring now to FIG. 2, by way of the present invention, in the event of a failover scenario, the secure session between the first device and the second device can be replicated to the failover device and can be resumed. Instead of regenerating all the messages shown in FIG. 1, the present invention only requires the regeneration of a subset of the messages, which saves time and is less compute intensive. More specifically, the messages requiring generation of session keys are not required. In this environment 50, the following messages are generated in order to resume the secure session.

The first message is a Client Hello message 16. The first device 12 sends the failover device information including the highest version of SSL it supports and a list of the cipher suites it supports. The cipher suite information includes cryptographic algorithms and key sizes.

Next, the failover device sends a Server Hello message 18 to the first device. The failover device 14 chooses the highest version of SSL and the best cipher suite that both the first device 12 and the failover device 14 support and sends this information to the first device 12.

A Change Cipher Spec message 30 is sent next. The failover device 14 sends this message to direct the first device 12 to change to encrypted mode.

A Finished message 32 is then sent. The failover device 14 tells the first device 12 that it is ready for secure data communication to begin A Change Cipher Spec message 26 is then sent. The first device 12 sends a message telling the failover device 14 to change to encrypted mode.

Next, a Finished message 28 is sent. This message is sent by the first device 12 to notify the failover device 14 that it is ready for secure data communication to begin. This is the end of the SSL handshake.

Following the handshake described above, the first device and the server resume the secure session, shown as Encrypted Data 34.

The following signals are not generated during the resumption of the secure session: a server key exchange message wherein the server sends the first device a server key exchange message with the public key information; a server hello done message wherein the server tells the first device that it is finished with its initial negotiation messages; and a first device key exchange message wherein the first device generates information used to create a key to use for symmetric encryption. As a result, a secure session can be replicated and resumed on a failover device with a minimal amount of time and processing.

Figure 3:
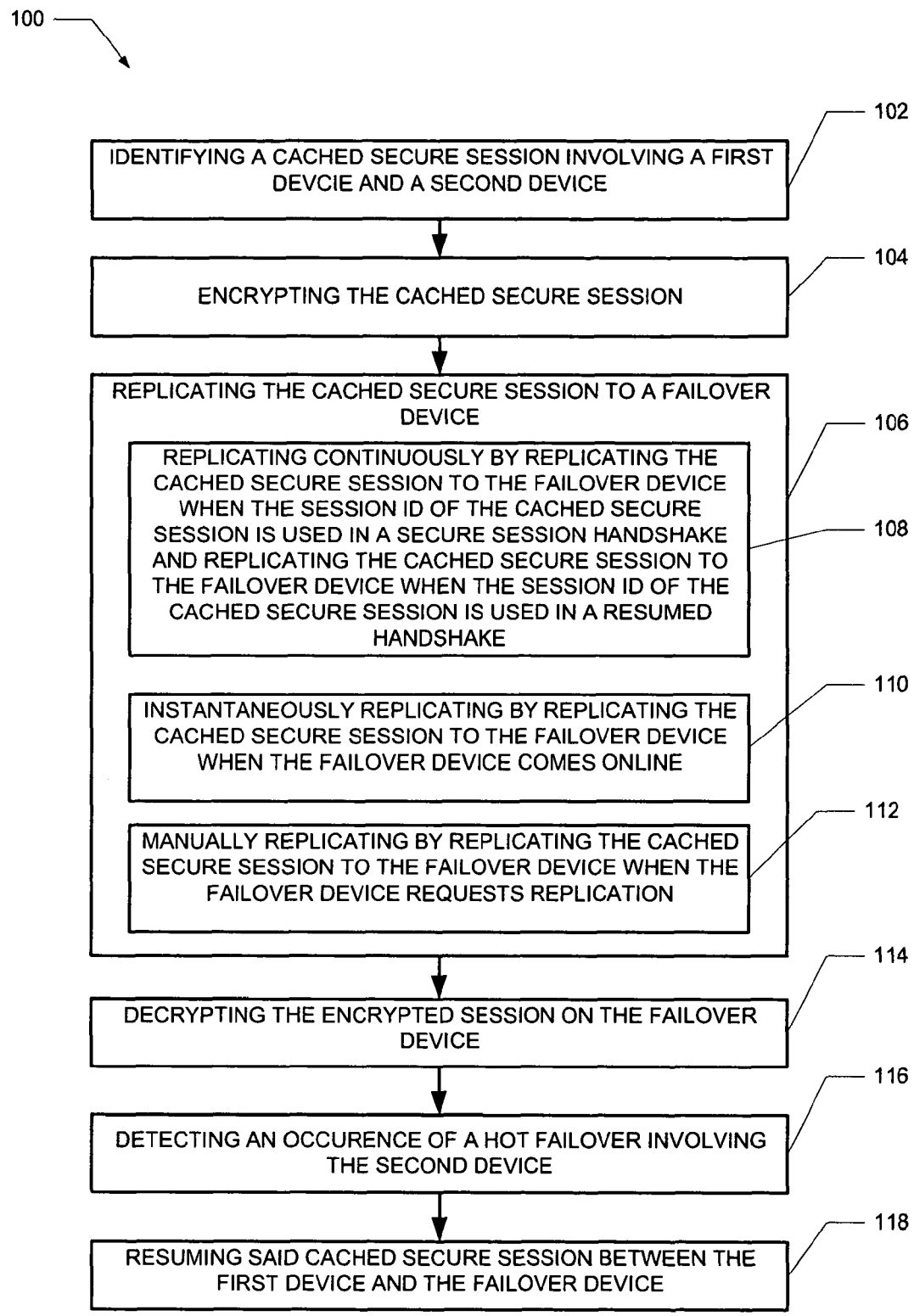
FIG. 3 comprises a flow diagram of a method of providing failover capability of cached secure sessions in accordance with embodiments of the invention.

A flow chart of the presently disclosed method is depicted in FIG. 3. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 of providing failover capability of cached secure sessions is shown. The method begins with processing block 102, wherein a cached secure session involving a first device and a second device is identified. This cached secure session will be replicated and the secure session resumed on a failover device.

In processing block 104, the cached secure session is encrypted. The sending and receiving of the secure session cache information is done using encryption (e.g. AES) which allows the data structures to be shared among the active and failover devices without security concerns. The encryption is done using a master secret which is encrypted using a Master Encryption Key. The active device and the failover device have previously had identical Master Encryption Keys installed on them.

In processing block 106, the cached secure session is replicated to a failover device. In a particular embodiment there are three modes used for replicating the cached secure session to the failover device: a continuous mode, an instantaneous mode and a manual mode.

In processing block 108, the replication of the cached secure session is done using the continuous mode. This is accomplished by replicating the cached secure session to the failover device when the session ID of the cached secure session is used in a secure session handshake. This may also be accomplished by replicating the cached secure session to the failover device when the session ID is used in a resumed handshake.

In processing block 110, the replication of the cached secure session is done using the instantaneous mode. This instantaneous mode replication involves replicating the cached secure session to the failover device when the failover device comes online.

In processing block 112 the replication of cached secure session is done using the manual mode. Manual replication includes replicating the cached secure session to the failover device when the failover device requests the replication. In this mode, the failover device can request the active device to send its session cache information. The active device does not have to have the session cache replication configured. This is useful in the case where an active device is normally used without a failover device configured. Another example of the use of manual mode replication is in preparation for a scheduled maintenance period. In this example, a failover device is brought online, and the failover device requests the active device replicate its session cache. This session cache replication can be initiated from the failover device without having to modify the configuration on the active device.

In processing block 114, the encrypted session is decrypted on the failover device, and in processing block 116 an occurrence of a hot failover involving the second device is detected. This may occur, for example, if the second device experiences a system failure, a lost network connection, or similar type failure condition.

In processing block 118, the cached secure session is resumed between the first device and the failover device. The session has been resumed without going through the entire secure session handshake process that requires the time consuming generation of session keys. Instead, processing resumes using the cached secure session and using only a subset of the handshaking messages required in conventional systems. In such a manner, failover of a secure session can be performed securely and with minimal processing required.

Figure 4:
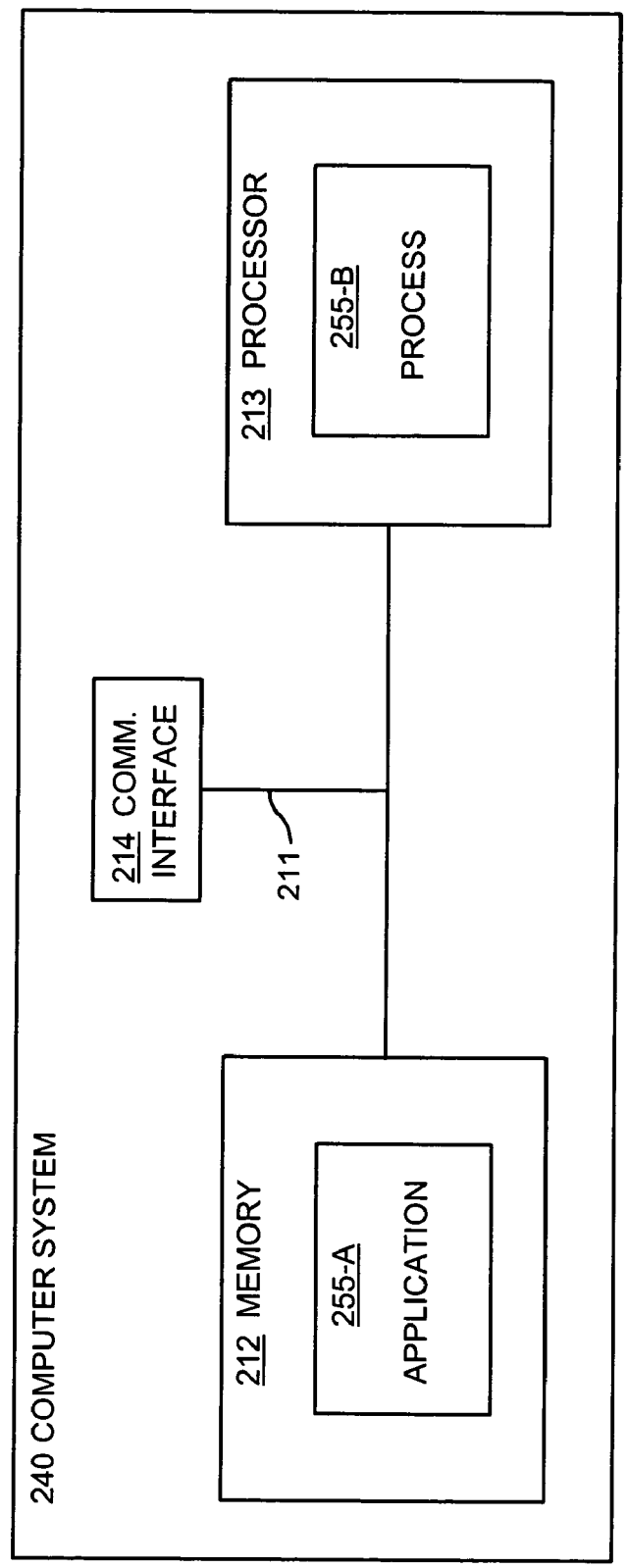
FIG. 4 illustrates an example computer system architecture for a computer system that performs failover capability of cached secure sessions in accordance with embodiments of the invention.

FIG. 4 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operates as explained in former examples are represented in FIG. 4 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
a first computing device encrypting one or more sets of information for cached secure sessions;
the first device sending, to a failover device, the encrypted one or more sets of information for the cached secure sessions;
wherein the one or more sets of information for the cached secure sessions comprise cryptographic key information negotiated between the first device and a plurality of second devices and not messages requiring generation of session keys;
wherein the one or more sets of information for the cached secure sessions comprises information that allows the failover device to resume the cached secure sessions with the plurality of second devices without generating additional session keys for the cached secure sessions;
wherein the cryptographic key information is negotiated in at least one of a TLS session or a SSL session.

2. The method of claim 1, wherein encrypting one or more sets of information for cached secure sessions comprises encrypting, using a master key, the one or more sets of information for cached secure sessions; wherein the first device and the failover device negotiate the master key prior to the first device sending the encrypted one or more sets of information for the cached secure sessions.

3. The method of claim 2, wherein the master key is a symmetric key.

4. The method of claim 2, wherein the first device is a server and the plurality of second devices are client devices; and wherein the sending comprises sending the encrypted one or more sets of information for the cached secure sessions over an Ethernet network.

5. The method of claim 1, wherein the first device sends the encrypted one or more sets of information for the cached secure sessions when the failover device comes online.

6. The method of claim 1, wherein the first device sends the encrypted one or more sets of information for the cached secure sessions in response to a request from the failover device for the one or more sets of information for the cached secure sessions.

7. An apparatus comprising:
a processor;
a memory configured to store instructions, which, when executed by the processor, cause the apparatus to perform:
encrypting one or more sets of information for cached secure sessions,
sending, to a failover device from the apparatus, the encrypted one or more sets of information for the cached secure sessions,
wherein the one or more sets of information for the cached secure sessions comprise cryptographic key information negotiated between the apparatus and a plurality of second devices and not messages requiring generation of session keys;
wherein the one or more sets of information for the cached secure sessions comprises information that allows the failover device to resume the cached secure sessions with the plurality of second devices without generating additional session keys for the cached secure sessions;
wherein the cryptographic key information is negotiated in at least one of a TLS session or a SSL session.

8. The apparatus of claim 1, wherein instructions for encrypting one or more sets of information for cached secure sessions comprises instructions for encrypting, using a master key, the one or more sets of information for cached secure sessions; wherein instructions further cause the apparatus and the failover device negotiate the master key prior to the first device sending the encrypted one or more sets of information for the cached secure sessions.

9. The apparatus of claim 1, wherein the apparatus is configured as a server, the plurality of second devices are client devices; and wherein instructions for sending, to a failover device from a first device, the encrypted one or more sets of information for cached secure sessions comprise instructions for sending the encrypted one or more sets of information for the cached secure sessions over an Ethernet network.

10. The apparatus of claim 1, wherein instructions cause the apparatus to send the encrypted one or more sets of information for the cached secure sessions when the failover device comes online.

11. The apparatus of claim 1, wherein the instructions cause the apparatus to send the encrypted one or more sets of information for the cached secure sessions in response to a request from the failover device for the one or more sets of information for the cached secure sessions.

12. A non-transitory computer-readable medium storing instructions that, when executed by one or more processors, cause:
- a first computing device encrypting one or more sets of information for cached secure sessions;
- the first device sending, to a failover device, the encrypted one or more sets of information for the cached secure sessions;
- wherein the one or more sets of information for the cached secure sessions comprise cryptographic key information negotiated between the first device and a plurality of second devices and not messages requiring generation of session keys;
- wherein the one or more sets of information for the cached secure sessions comprises information that allows the failover device to resume the cached secure sessions with the plurality of second devices without generating additional session keys for the cached secure sessions;
- wherein the cryptographic key information is negotiated in at least one of a TLS session or a SSL session.

13. The non-transitory computer-readable medium of claim 12, wherein instructions for encrypting one or more sets of information for cached secure sessions comprise instructions for encrypting, using a master key, the one or more sets of information for cached secure sessions; wherein the instructions cause the first device and the failover device negotiate the master key prior to the first device sending the encrypted one or more sets of information for the cached secure sessions.

14. The non-transitory computer-readable medium of claim 13, wherein the master key is a symmetric key.

15. The non-transitory computer-readable medium of claim 12, where the first device is a server, the plurality of second devices are client devices; and wherein instructions for sending, to a failover device from a first device, the encrypted one or more sets of information for cached secure sessions comprises instructions for sending the encrypted one or more sets of information for the cached secure sessions over an Ethernet network.

16. The non-transitory computer-readable medium of claim 12, wherein the instructions cause the first device to send the encrypted one or more sets of information for the cached secure sessions when the failover device comes online.

17. The non-transitory computer-readable medium of claim 12, wherein the instructions cause the first device to send the encrypted one or more sets of information for the cached secure sessions in response to a request from the failover device for the one or more sets of information for the cached secure sessions.

* * * * *